US009541967B1

(12) United States Patent
Chen et al.

(10) Patent No.: US 9,541,967 B1
(45) Date of Patent: Jan. 10, 2017

(54) HARD DISK AND HOUSING THEREOF

(71) Applicant: CompTake Technology Inc., New Taipei (TW)

(72) Inventors: Wei-Hau Chen, New Taipei (TW); Tung-Lin Liu, New Taipei (TW)

(73) Assignee: CompTake Technology Inc., New Taipei (TW)

( * ) Notice: Subject to any disclaimer, the term of this patent is extended or adjusted under 35 U.S.C. 154(b) by 0 days.

(21) Appl. No.: 14/824,850

(22) Filed: Aug. 12, 2015

(51) Int. Cl.
*G06F 1/16* (2006.01)
*G06F 1/18* (2006.01)

(52) U.S. Cl.
CPC .................. *G06F 1/181* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,111,362 A * | 5/1992 | Flamm | ............... | H05K 7/142 220/4.02 |
| 5,187,643 A * | 2/1993 | I-Shou | ............... | G06F 1/181 361/679.37 |
| 5,349,483 A * | 9/1994 | Tsai | ............... | G11B 33/02 360/99.23 |
| 5,481,434 A * | 1/1996 | Banakis | ............... | G06K 19/18 361/736 |
| 6,775,132 B2 * | 8/2004 | Chen | ............... | G06F 1/184 312/223.1 |
| 6,798,652 B2 * | 9/2004 | Wang | ............... | G06F 1/187 312/223.1 |
| 7,040,905 B1 * | 5/2006 | Wang | ............... | H05K 7/1404 361/759 |
| 7,911,776 B2 * | 3/2011 | Ikeda | ............... | G11B 33/124 361/679.33 |
| 8,531,845 B2 * | 9/2013 | Chen | ............... | H05K 5/0208 361/752 |
| 8,717,752 B2 * | 5/2014 | Dunham | ............... | H05K 1/141 248/222.11 |
| 2009/0168325 A1 * | 7/2009 | Yeh | ............... | G11B 33/022 361/679.33 |
| 2010/0265675 A1 * | 10/2010 | Aoki | ............... | H05K 5/0269 361/752 |
| 2014/0063724 A1 * | 3/2014 | Chen | ............... | G06F 21/86 361/679.33 |

(Continued)

*Primary Examiner* — Lisa Lea Edmonds
(74) *Attorney, Agent, or Firm* — Chun-Ming Shih; HDLS IPR Services

(57) ABSTRACT

A hard disk includes a first cover member including a first cover plate and a pair of first lateral walls extended from edges of thereof, each of the first lateral wall is formed with a support piece and a latch hook respectively protruded towards inward, the support piece and the latch hook are not arranged at same horizontal level in a direction perpendicular to the first cover plate; a second cover member, disposed at the outer side of the first cover member and engaged with the first cover member; and a storage module, accommodated inside the first cover member and including a circuit board having edges thereof clamped between distal ends of the latch hooks and the support pieces. Accordingly, the assembly can be easily achieved through fastening the storage module in the first cover member then sleeving the first cover member and the second cover member.

14 Claims, 5 Drawing Sheets

(56) References Cited

U.S. PATENT DOCUMENTS

| | | | | |
|---|---|---|---|---|
| 2014/0063725 A1* | 3/2014 | Chen | ................ | G06F 21/86 |
| | | | | 361/679.33 |
| 2014/0111069 A1* | 4/2014 | Chen | ................ | G06F 1/1658 |
| | | | | 312/223.2 |
| 2014/0118921 A1* | 5/2014 | Lin | ................ | G11B 33/124 |
| | | | | 361/679.33 |

* cited by examiner

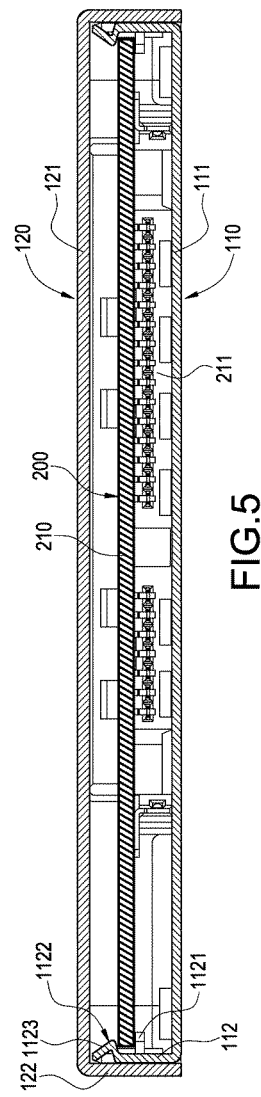
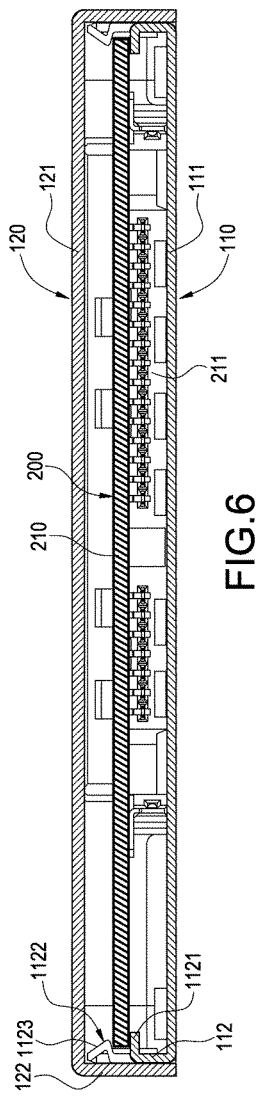

HARD DISK AND HOUSING THEREOF

BACKGROUND OF THE INVENTION

Field of the Invention

The present invention relates to a hard disk, especially to a hard disk capable of being assembled without any tool and a housing thereof.

Description of Related Art

A conventional solid-state hard disk includes a circuit board installed with a memory and a connector, and the circuit board needs to be accommodated inside a metal housing for protection. Generally, the metal housing includes an upper cover and a lower cover capable of being closely engaged; the circuit board is firstly locked and fastened in the lower cover, then the lower cover is closely engaged and locked with the upper cover, thereby preventing the circuit board from shaking inside the metal housing so as to be protected from being damaged. As such, the assembly procedure for the conventional solid-state hard disk requires more working time and more labor for locking screws.

Accordingly, the applicant of the present invention has devoted himself for researching and inventing a novel design for improving the above-mentioned disadvantages.

SUMMARY OF THE INVENTION

The present invention is to provide a hard disk capable of being assembled without any tool and a housing thereof.

Accordingly, the present invention provides a hard disk, which includes a first cover member, a second cover member and a storage module. The first cover member includes a first cover plate and a pair of first lateral walls extended from edges of the first cover plate, the pair of first lateral walls are oppositely arranged, each of the first lateral wall is formed with a support piece and a latch hook respectively protruded towards the interior of the first cover member, the distal end of each of the latch hooks is spaced away from the first lateral wall, the support piece and the latch hook on each of the first lateral walls are not arranged at same horizontal level in a direction perpendicular to the first cover plate. The second cover member is sleeved at the outer side of the first cover member and closely engaged with the first cover member. The storage module includes a circuit board, and edges of the circuit board are clamped between the distal ends of the latch hooks and the support pieces.

Preferably, the second cover member includes a second cover plate and a pair of second lateral walls respectively extended from edges of the second cover plate, the second cover plate and the first cover plate are spaced with an interval and arranged to be in parallel with each other, and each of the second lateral walls is respectively arranged to be adjacent to each of the first lateral walls. The outer surface of the first cover member is formed with a buckle hole on each of the first lateral walls, the pair of second lateral walls are oppositely arranged, each of the second lateral walls is formed with a protruding hook protruded towards the interior of the second cover member, the protruding hook is corresponding to the buckle hole and the protruding hook is buckled in the buckle hole. The support piece is arranged to be closer than the latch hook with respect to the first cover plate along the direction perpendicular to the first cover plate. The distal end of the latch hook is formed with a guiding inclined surface.

Preferably, each of the first lateral walls is formed with a plurality of the support pieces and a plurality of the latch hooks, each of the latch hooks is adjacently arranged with the corresponding support piece, each of the latch hooks and the corresponding support piece on each of the first lateral walls are not arranged at the same horizontal level in the direction perpendicular to the first cover plate, and each of the latch hooks and the corresponding support piece are respectively served to clamp edges of the circuit board. The support piece is arranged to be closer than the latch hook with respect to the first cover plate along the direction perpendicular to the first cover plate, and two sides of each of the latch hooks are arranged with one of the plural support pieces, respectively.

Accordingly, the present invention provides a housing of a hard disk, used for accommodating a storage module, the storage module includes a circuit board, the housing of the hard disk includes a first cover member used for accommodating the storage module and a second cover member. The first cover member includes a first cover plate and a pair of first lateral walls extended from edges of the first cover plate, the pair of first lateral walls are oppositely arranged, each of the first lateral walls is formed with a support piece and a latch hook respectively protruded towards the interior of the first cover member, the distal end of each of the latch hooks is spaced away from the first lateral wall, the support piece and the latch hook on each of the first lateral walls are not arranged at same horizontal level in the direction perpendicular to the first cover plate, and edges of the circuit board are clamped between the distal ends of the latch hooks and the support pieces. The second cover member is sleeved at the outer side of the first cover member and closely engaged with the first cover member.

Preferably, the second cover member includes a second cover plate and a pair of second lateral walls respectively extended from edges of the second cover plate, the second cover plate and the first cover plate are spaced with an interval and arranged to be in parallel with each other, and each of the second lateral walls is respectively arranged to be adjacent to each of the first lateral walls. The outer surface of the first cover member is formed with a buckle hole on each of the first lateral walls, the pair of second lateral walls are oppositely arranged, each of the second lateral walls is formed with a protruding hook protruded towards the interior of the second cover member, the protruding hook is corresponding to the buckle hole and the protruding hook is buckled in the buckle hole. The support piece is arranged to be closer than the latch hook with respect to the first cover plate along the direction perpendicular to the first cover plate. The distal end of the latch hook is formed with a guiding inclined surface.

Preferably, each of the first lateral walls is formed with a plurality of the support pieces and a plurality of the latch hooks, each of the latch hooks is adjacently arranged with the corresponding support piece, each of the latch hooks and the corresponding support piece on each of the first lateral walls are not arranged at the same horizontal level in the direction perpendicular to the first cover plate. The support piece is arranged to be closer than the latch hook with respect to the first cover plate along the direction perpendicular to the first cover plate, and two sides of each of the latch hooks are arranged with one of the plural support pieces, respectively.

In comparison with related art, the present invention has advantageous features as follows: the assembly of the hard disk provided by the present invention can be achieved without utilizing any tool, the assembly is able to be easily achieved through fastening the storage module in the first cover member then sleeving the first cover member and the second cover member, thus the assembly can be rapidly finished.

BRIEF DESCRIPTION OF DRAWING

FIG. 5 is a cross sectional view showing the hard disk according to one preferred embodiment of the present invention; and FIG. 6 is another cross sectional view showing the hard disk according to one preferred embodiment of the present invention.

DETAILED DESCRIPTION OF THE INVENTION

Figure 1:
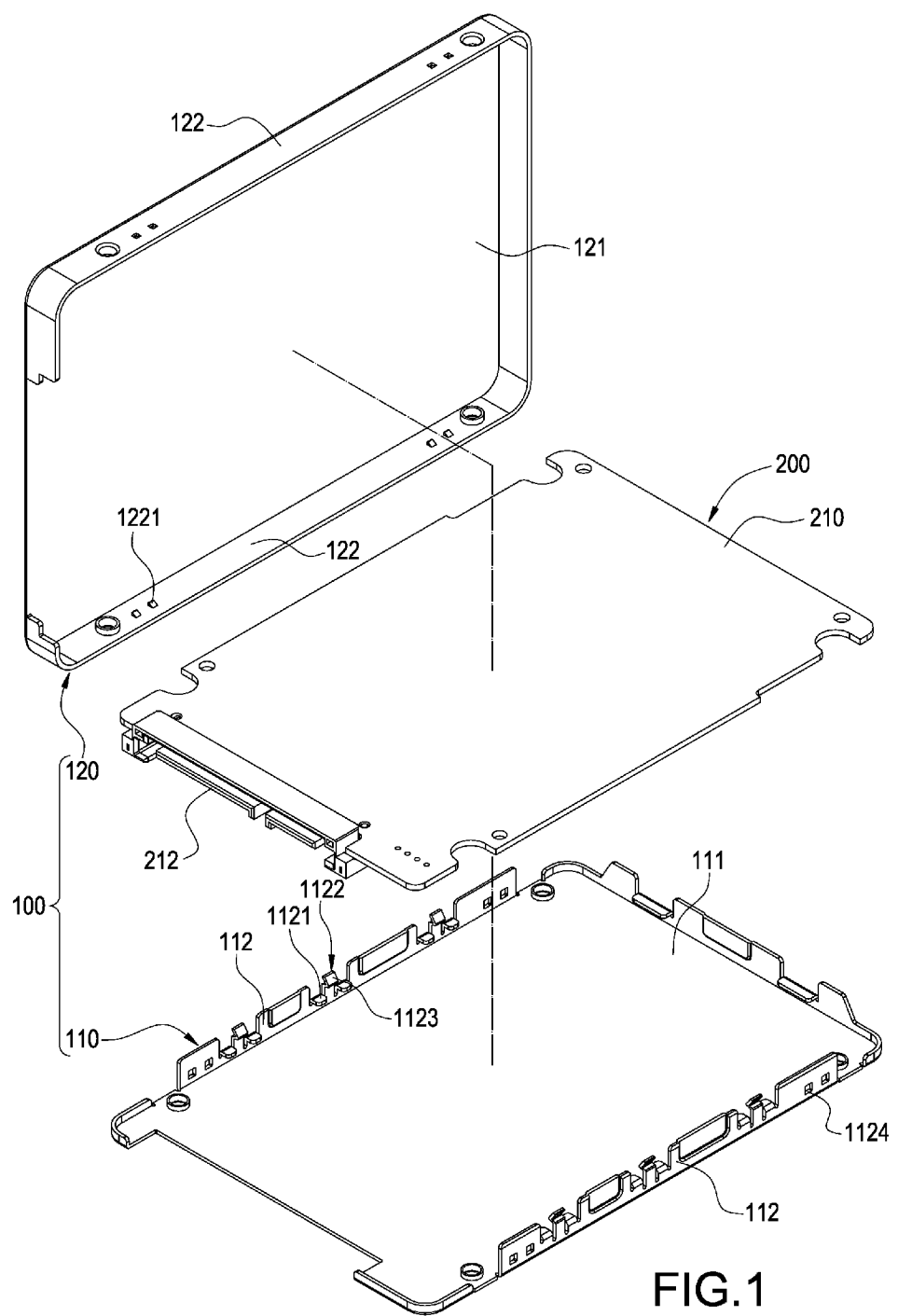
FIG. 1 is a perspective exploded view showing a hard disk according to one preferred embodiment of the present invention.

A preferred embodiment of the present invention will be described with reference to the drawings.

Please refer from FIG. 1 to FIG. 6, the present invention provides a hard disk, which includes a housing 100 and a storage module 200 accommodated inside the housing 100. According to one preferred embodiment of the present invention, the housing 100 preferably includes a first cover member 110 and a second cover member 120 which are made of a metal material.

The first cover member 110 includes a first cover plate 111, and according to this embodiment, the first cover plate 111 is preferably formed in a rectangular shape. Opposite edges of the first cover plate 111 are respectively extended with a first lateral wall 112 perpendicular to the first cover plate 111, and the pair of first lateral walls 112 are oppositely arranged. Each of the first lateral walls 112 is respectively extended with at least one support piece 1121, and each of the support pieces 1121 is respectively bent and protruded towards the interior of the first cover member 110, according to this embodiment, each of the first lateral walls 112 is formed with a plurality of the support pieces 1121, but what shall be addressed is that the scope of the present invention is not limited by the quantity of the support pieces 1121. Each of the first lateral walls 112 is respectively extended with a latch hook 1122 corresponding to each of the support pieces 1121, and the distal end of each of the latch hooks 1122 is bent and protruded towards the interior of the first cover member 110 so as to form a guiding inclined surface 1123. The distal end of each of the latch hooks 1122 is spaced away from the corresponding first lateral wall 112, thereby allowing each of the latch hooks 1122 to be pushed and moved on the corresponding first lateral wall 112. Each of the support pieces 1121 and the corresponding latch hook 1122 on each of the first lateral walls 112 are not arranged at same horizontal level in a direction perpendicular to the first cover plate 111, according to this embodiment, two sides of each of the latch hooks 1122 are arranged with one of the support pieces 1121, respectively; and the support piece 1121 is arranged to be closer than the latch hook 1122 with respect to the first cover plate 111 along the direction perpendicular to the first cover plate 111. The latch hooks 1122 and the support pieces 1121 are arranged in a row-like manner along the first lateral wall 112, and one end of the first lateral wall 112 is arranged with one of the latch hooks 1122 and the other end of the first lateral wall 112 is arranged with one of the support pieces 1121. The outer surface of the first cover member 110 is formed with at least one buckle hole 1124 on each of the first lateral walls 112, according to this embodiment, each of the first lateral walls 112 is formed with a plurality of the buckle holes 1124, but what shall be addressed is that the scope of the present invention is not limited by the quantity of the buckle holes 1124.

The second cover member 120 is disposed at the outer side of the first cover member 110 and closely engaged with the first cover member 110. The second cover member 120 includes a second cover plate 121, according to this embodiment, the second cover plate 121 is preferably formed in a rectangular shape and the dimension thereof is corresponding to the dimension of the first cover plate 111, and the second cover plate 121 is arranged in parallel with the first cover plate 111. Opposite edges of the second cover plate 121 are respectively extended with a second lateral wall 122, and the pair of second lateral walls 122 are oppositely arranged. Each of the second lateral walls 122 is formed with a protruding hook 1221 corresponding to of the buckle hole 1124 and protruded towards the interior of the second cover member 120. Each of the second lateral walls 122 is able to be adjacent to each of the first lateral walls 112, and the protruding hook 1221 is buckled in the buckle hole 1124.

The storage module 200 is accommodated inside the first cover member 110 and includes a circuit board 210, and the circuit board 210 is installed with a memory 211 and a connector 212. The dimension of the circuit board 210 is corresponding to the dimension of the first cover plate 111, thereby enabling edges of the circuit board 210 to be clamped between the distal end of each of the latch hooks 1122 and the corresponding support piece 1121. Accordingly, the storage module 200 is able to be fastened in the first cover member 110, and two surfaces of the circuit board 210 are able to be respectively shielded by the first cover member 110 and the second cover member 120, thus the storage module 200 is able to be enclosed by the housing 100 for being protected.

Figure 2:
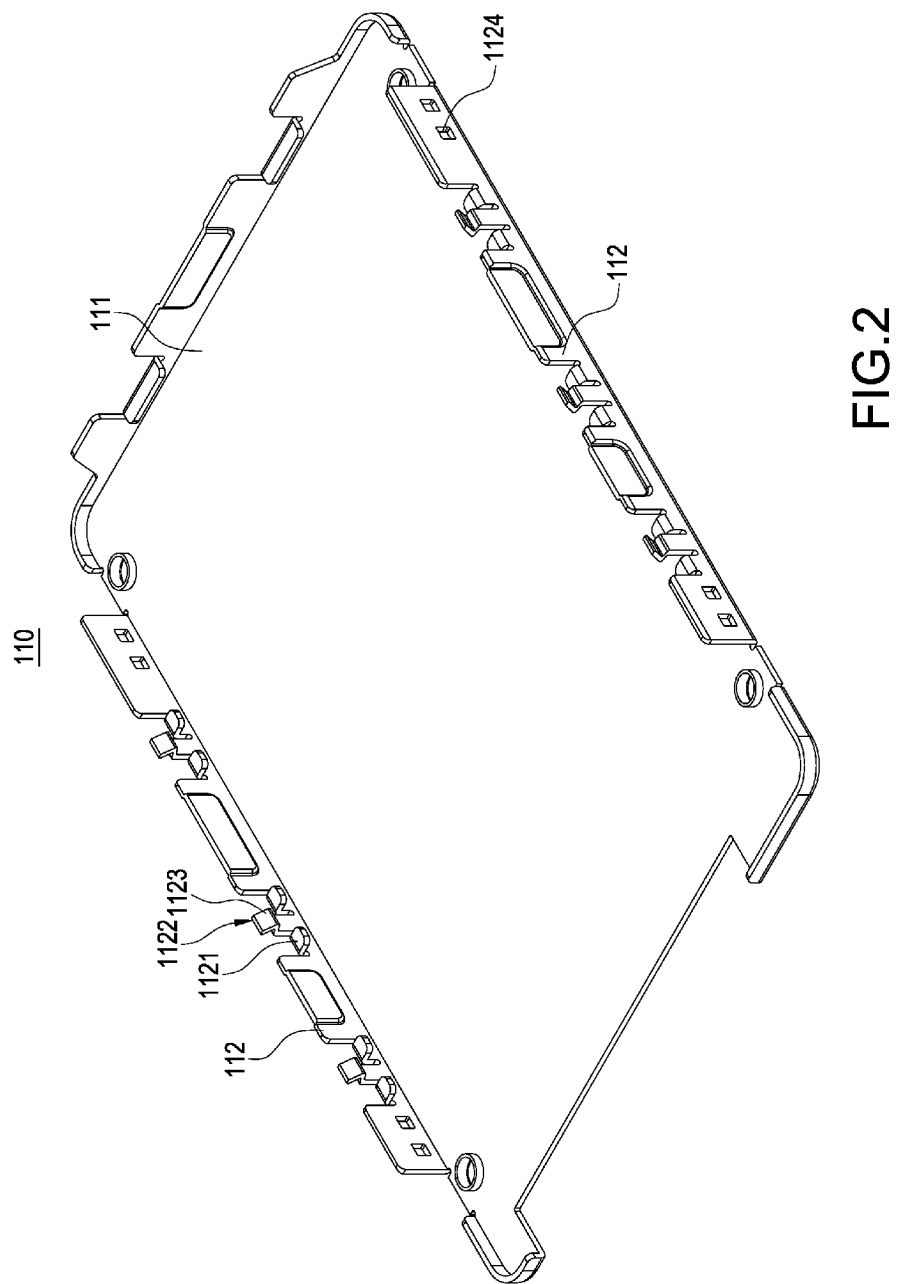
FIG. 2 is a perspective view showing a first cover member of the hard disk according to one preferred embodiment of the present invention.
Figure 3:
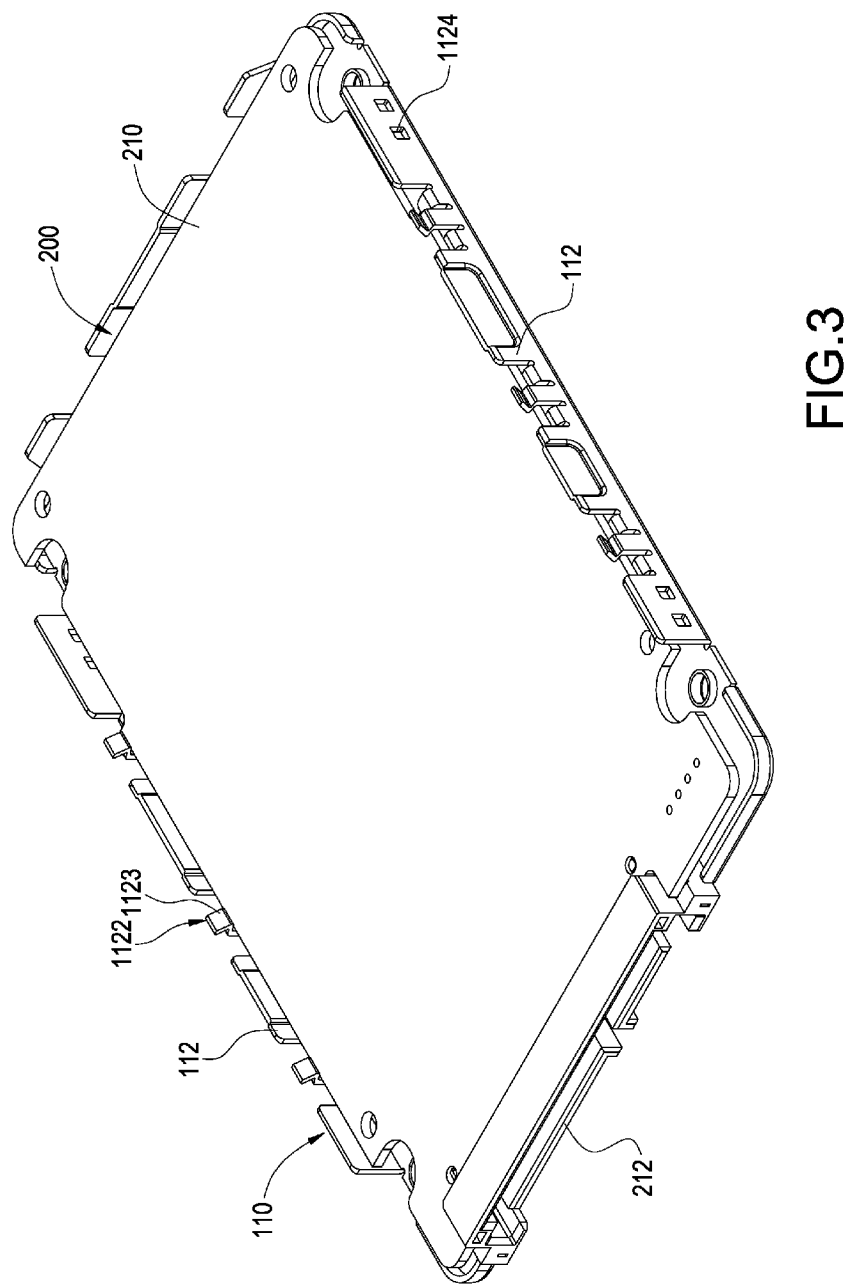
FIG. 3 is a perspective view showing the first cover member being assembled with a storage module according to one preferred embodiment of the present invention.

As shown in FIG. 2 and FIG. 3, when the hard disk of the present invention is assembled, the storage module 200 is pressed towards the first cover plate 111, the edges of the circuit board 210 are abutted against the guiding inclined surface 1123 formed on the distal end of each of the latch hooks 1122, so each of the latch hooks 1122 is respectively pushed and outwardly stretched on the corresponding first lateral walls 112. As such, the edges of the circuit board 210 are able to pass the latch hooks 1122 and be pushed into a space formed between each of the latch hooks 1122 and the corresponding support piece 1121 so as to be clamped and fastened. Each of the latch hooks 1122 and the support pieces 1121 arranged at two sides of the corresponding latch hook 1122 can form a three-point relation, thereby allowing the edges of the circuit board 210 to be more stably clamped and fastened.

Figure 4:
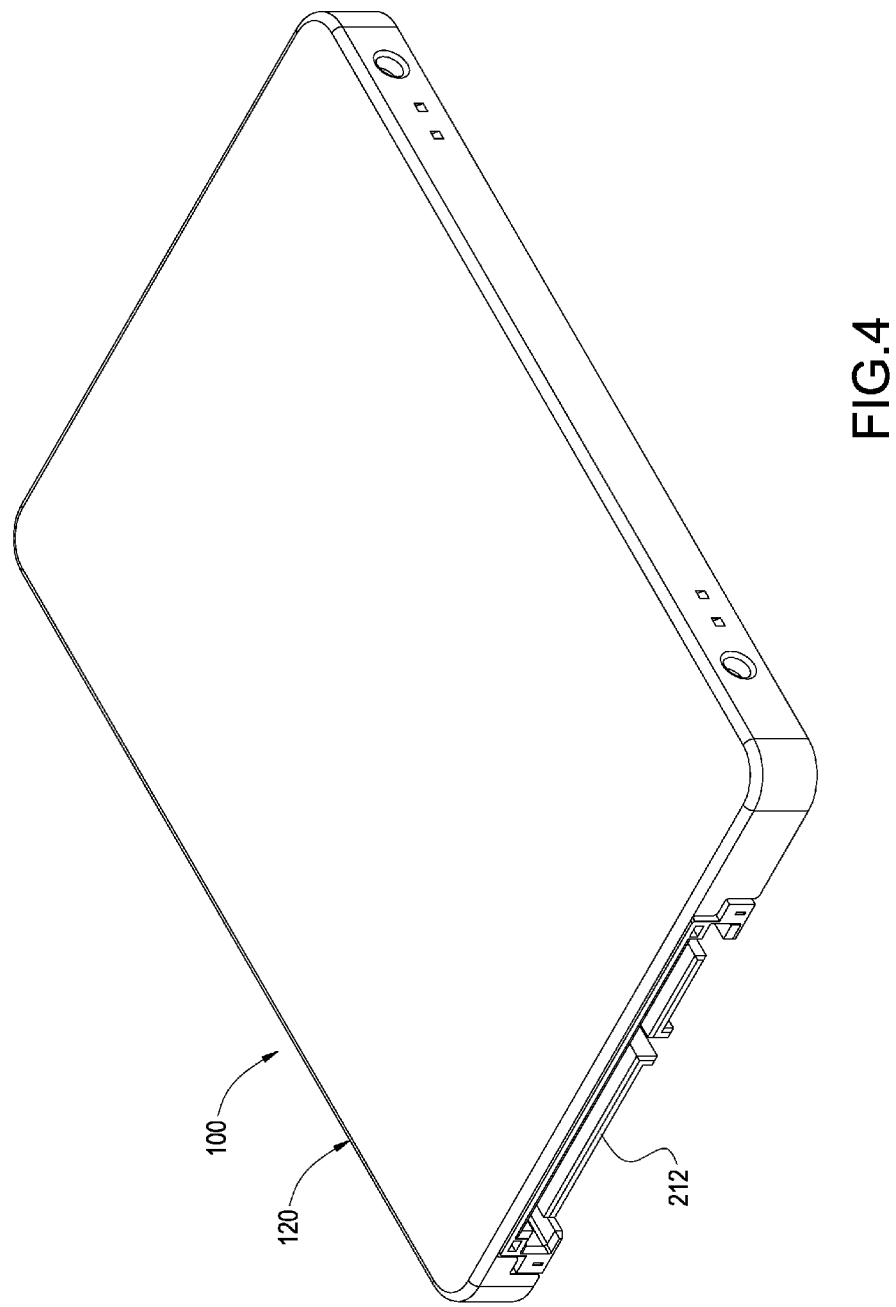
FIG. 4 is a perspective view showing the assembly of the hard disk according to one preferred embodiment of the present invention.

As shown in FIG. 3 and FIG. 4, when the second cover member 120 is closely engaged with the first cover member 110, the protruding hook 1221 at the inner side of the second cover member 120 is able to be buckled in the buckle hole 1124 at the outer side of the first cover member 110, thereby allowing the first cover member 110 and the second cover member 120 to be closely engaged and fastened. Based on what has been disclosed above, the assembly of the hard disk provided by the present invention can be achieved through fastening the storage module 200 in the first cover member 110 then sleeving the first cover member 110 and the second cover member 120. As such, the assembly of the hard disk provided by the present invention does not require any tool (for example a screwdriver) and the assembly can be rapidly finished.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A hard disk, including:
a first cover member, including a first cover plate and a pair of first lateral walls extended from edges of the first cover plate, wherein the pair of first lateral walls are oppositely arranged, each of the first lateral walls is formed with a support piece and a latch hook respectively protruded towards the interior of the first cover member, the distal end of each of the latch hooks is spaced away from the first lateral wall, and the support piece and the latch hook on each of the first lateral walls are not arranged at same horizontal level in a direction perpendicular to the first cover plate;
a second cover member, disposed at the outer side of the first cover member and closely engaged with the first cover member; and
a storage module, accommodated inside the first cover member and including a circuit board, wherein edges of the circuit board are clamped between distal ends of latch hooks and support pieces of the pair of first lateral walls,
wherein the outer surface of the first cover member is formed with a buckle hole on each of the first lateral walls, the pair of second lateral walls are oppositely arranged, each of the second lateral walls is formed with a protruding hook protruded towards the interior of the second cover member, the protruding hook is corresponding to the buckle hole, and the protruding hook is buckled in the buckle hole.

2. The hard disk according to claim 1, wherein the second cover member includes a second cover plate and a pair of second lateral walls respectively extended from edges of the second cover plate, the second cover plate and the first cover plate are spaced with an interval and arranged to be in parallel with each other, and each of the second lateral walls is arranged to be adjacent to each of the first lateral walls.

3. The hard disk according to claim 1, wherein the support piece is arranged to be closer than the latch hook with respect to the first cover plate along the direction perpendicular to the first cover plate.

4. The hard disk according to claim 1, wherein the distal end of the latch hook is formed with a guiding inclined surface.

5. The hard disk according to claim 1, wherein each of the first lateral walls is formed with a plurality of the support pieces and a plurality of the latch hooks, each of the latch hooks is adjacently arranged with the corresponding support piece, each of the latch hooks and the corresponding support piece are not arranged at the same horizontal level in the direction perpendicular to the first cover plate, and each of the latch hooks and the corresponding support piece are respectively served to clamp edges of the circuit board.

6. The hard disk according to claim 5, wherein the support piece is arranged to be closer than the latch hook with respect to the first cover plate along the direction perpendicular to the first cover plate.

7. The hard disk according to claim 5, wherein two sides of each of the latch hooks are arranged with one of the support pieces, respectively.

8. A housing of a hard disk, used for accommodating a storage module having a circuit board, including:
a first cover member, used for accommodating the storage module and including a first cover plate and a pair of first lateral walls extended from edges of the first cover plate, wherein the pair of first lateral walls are oppositely arranged, each of the first lateral walls is formed with a support piece and a latch hook respectively protruded towards the interior of the first cover member, the distal end of the latch hook is spaced away from the first lateral wall, and the support piece and the latch hook on each of the first lateral walls are not arranged at same horizontal level in a direction perpendicular to the first cover plate, and edges of a circuit board are clamped between distal ends of the latch hook and the support piece of each of the first lateral walls; and
a second cover member, disposed at the outer side of the first cover member and closely engaged with the first cover member,
wherein an outer surface of the first cover member is formed with a buckle hole on each of the first lateral walls, a pair of second lateral walls are oppositely arranged, each of the second lateral walls is formed with a protruding hook protruded towards the interior of the second cover member, the protruding hook is corresponding to the buckle hole, and the protruding hook is buckled in the buckle hole.

9. The housing of a hard disk according to claim 8, wherein the second cover member includes a second cover plate and a pair of second lateral walls respectively extended from edges of the second cover plate, the second cover plate and the first cover plate are spaced with an interval and arranged to be in parallel with each other, and each of the second lateral walls is arranged to be adjacent to each of the first lateral walls.

10. The housing of a hard disk according to claim 8, wherein the support piece is arranged to be closer than the latch hook with respect to the first cover plate along the direction perpendicular to the first cover plate.

11. The housing of a hard disk according to claim 8, wherein the distal end of the latch hook is formed with a guiding inclined surface.

12. The housing of a hard disk according to claim 8, wherein each of the first lateral walls is formed with a plurality of the support pieces and a plurality of the latch hooks, each of the latch hooks is adjacently arranged with the corresponding support piece, and each of the latch hooks and the corresponding support piece are not arranged at the same horizontal level in the direction perpendicular to the first cover plate.

13. The housing of a hard disk according to claim 12, wherein the support piece is arranged to be closer than the latch hook with respect to the first cover plate along the direction perpendicular to the first cover plate.

14. The housing of a hard disk according to claim 12, wherein two sides of each of the latch hooks are arranged with one of the support pieces, respectively.

* * * * *